April 18, 1944.  A. M. STONER  2,346,706

COLLET

Filed May 4, 1943  2 Sheets-Sheet 1

INVENTOR.
Arthur Merrick Stoner
BY
E. W. Marshall
ATTORNEY

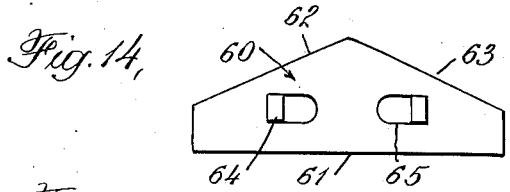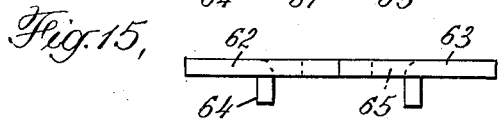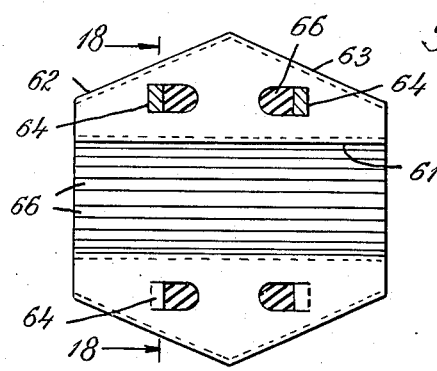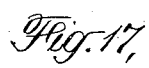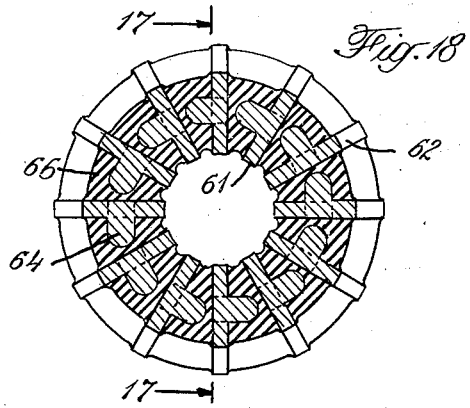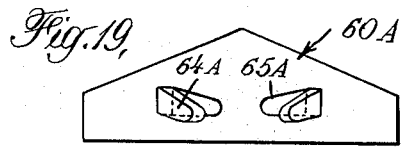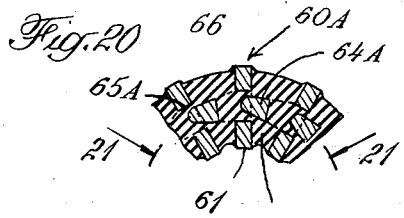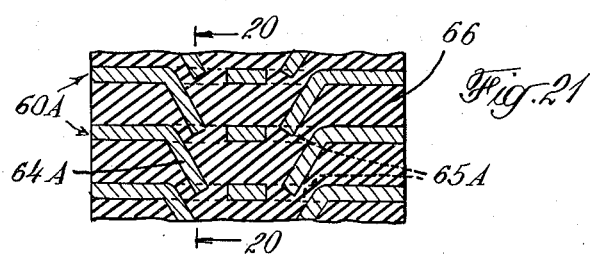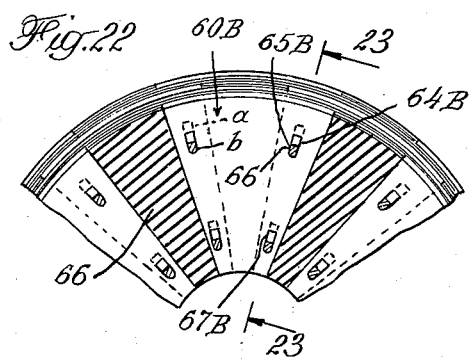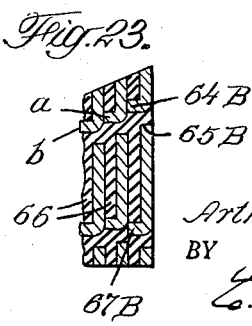

Patented Apr. 18, 1944

2,346,706

UNITED STATES PATENT OFFICE 2,346,706

COLLET

Arthur Merrick Stoner, West Hartford, Conn., assignor to The Jacobs Manufacturing Company, Hartford, Conn., a corporation of Connecticut Application May 4, 1943, Serial No. 485,583

13 Claims. (Cl. 279—46)

This invention relates to a collet of novel construction which is of simple, inexpensive construction and has many advantages over such devices as have been available heretofore.

In the drawings which form a part of this specification, Fig. 1 is a central sectional side elevation of a collet which is made according to and embodies the present invention. The section of this figure is taken on the line 1—1 of Fig. 2.

Figure 1:
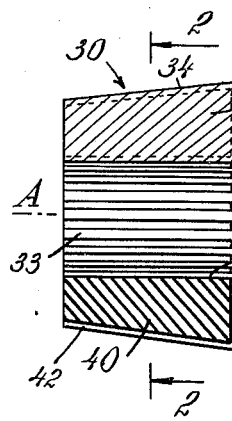
Figure 2:
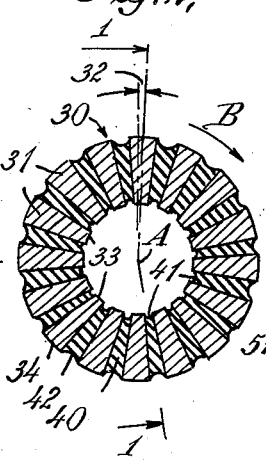
Fig. 2 is a sectional end elevation of the device shown in Fig. 1, the section being taken on the line 2—2 of the latter figure.
Figure 5:
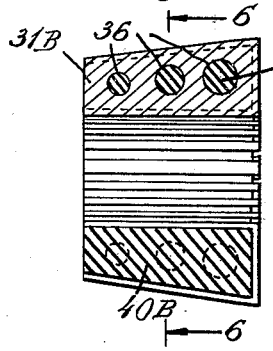
Figure 6:
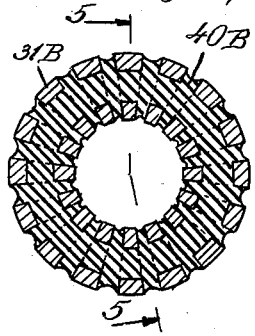

Figs. 5 and 6 are views similar to Figs. 1 and 2 showing another construction which also embodies my invention. The section in Fig. 5 is taken on the line 5—5 of Fig. 6 and the section in Fig. 6 is taken on the line 6—6 of Fig. 5.

Figure 7:
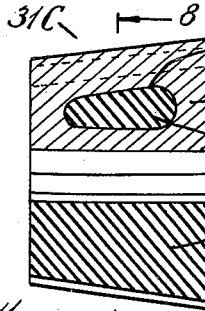
Figure 8:
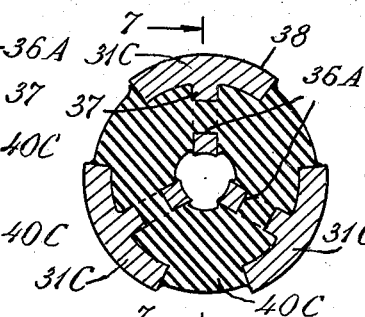

Another modified construction is shown in Figs. 7 and 8 which also are similar to Figs. 1 and 2. The section in Fig. 7 is taken on the line 7—7 of Fig. 8 and the section in Fig. 8 is taken on the line 8—8 of Fig. 7.

Figure 9:
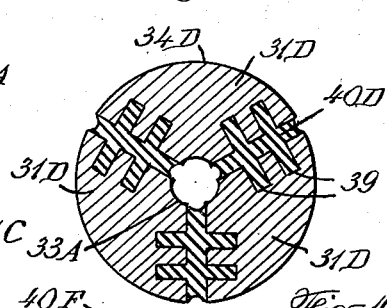

Another embodiment of the invention is illustrated in sectional end elevation in Fig. 9.

Figures 10, 13:
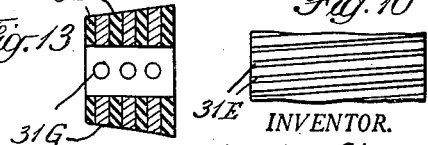

Fig. 10 is a partial plan view of a collet of which the members are spirally curved in relation to the central axis of the collet.

Figure 11:
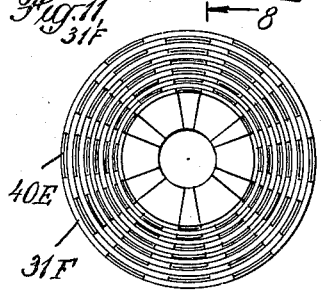
Figure 12:
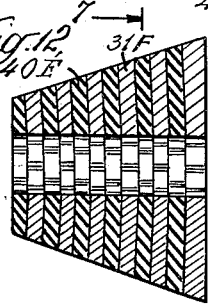

Fig. 11 is a rear elevation and Fig. 12 a sectional side elevation of a series of gripping members in the form of flat sector-like plates.

Fig. 13 is a central sectional side elevation of another simple embodiment of the invention.

Figs. 14, 15 and 16 are respectively a side elevation, an end view and a plan view of a gripping member of modified shape and construction.

Fig. 17 is a central sectional side elevation and Fig. 18 a sectional end view of a collet comprising gripping members like that shown in Figs. 14–16. The section in Fig. 17 is taken on the line 17—17 of Fig. 18 and the section in Fig. 18 is taken on the line 18—18 of Fig. 17.

Fig. 19 is a side elevation of a gripping member of further modified form.

Fig. 20 is a sectional end elevation of a part of a collet having gripping members in the form shown in Fig. 19.

Fig. 21 is a diagrammatic development of the parts shown in Fig. 20, the parts being shown in section on a curve 21—21, Fig. 20.

Fig. 22 is a portion of a collet comprising a plurality of sector-like metallic plates with abutting lugs and Fig. 23 is a sectional side elevation of the parts shown in Fig. 22, the section being taken on the line 23—23 of Fig. 22.

In Figs. 1, 2 and 3, 30 designates a collet which comprises a plurality of flat sided gripping members 31. These gripping members are made of hard material, such as hardened steel and in the form shown in Fig. 2 they are slightly wedge-shaped in cross section. These gripping members are equally spaced around a common axis A—A in longitudinal parallelism and positioned approximately radially in relation to this axis. They may be tilted slightly to the right of radial planes as shown at 32 in Fig. 2. In the particular example of the invention shown, the inner edges 33 of the gripping members are parallel to the axis A—A and their outer edges 34 are inclined thereto.

While the gripping members are held in the relative positions shown in Figs. 1 and 2, the spaces between them are filled with an adherent resilient material 40. Rubber or rubber composition is an example of a satisfactory material for the purpose of this invention and this can be vulcanized to adhere firmly to the gripping members. This effectively holds the gripping members in desired longitudinally and angularly spaced relations but because of its resiliency permits them to be moved out of these positions.

While the gripping members are held in the positions shown in Figs. 1 and 2, their inner edges 33 may be tooled or ground to lie in the surface of a cylinder concentric with the axis A—A, and their outer edges 34 finished to form parts of a frusto-conical surface also concentric with the axis A—A.

The inner, outer and front edges of the gripping members are exposed, that is, they are not covered by the resilient binder. If desired the latter may be depressed below these edges as shown at 41, 42 and 43.

Figure 3:
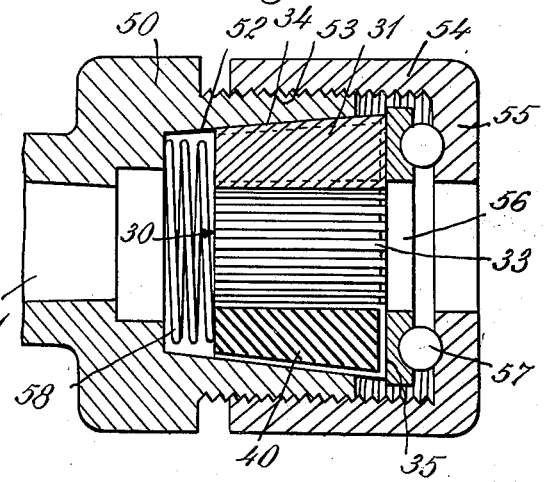
Fig. 3 is a central sectional side elevation of a chuck of which a collet of my novel construction is a part. This figure is included to show a way in which the collet disclosed herein may be used.

Before describing the collets shown in the remaining figures, I will refer to Fig. 3 and show one of the ways in which this invention may be used. In this Fig. 3, 50 designates the body of a chuck. In the rear end of this body is a tapered bore 51 by means of which it may be mounted on a machine tool. 52 is a conical cam surface in the front end of the body having an angularity which correspond to that of the outer edges 34 of the gripping members. The outer front end of the body is of reduced diameter and is externally threaded as at 53. 54 is a collar having internal threads which fit the threads 53. The collar has an inwardly projecting flange 55 which partly overlies the conical cam surface 52 in the body. After a collet 30, such as that shown in Figs. 1 and 2 has been placed within the conical cam surface 52, a thrust plate 56 is placed on the ends 35 of the gripping members and the collar 54 screwed onto the body 50. If desired, antifriction thrust bearings 57 may be interposed between the flange 55 and the thrust plate 56. 58 is a spring interposed between the inner end of the collet and the chuck body 50.

Now when a tool or other desired article is placed within the collet the collar 54 may be rotated further to impart a longitudinal movement to the thrust plate and to the collet. Unlike other collets the inner edges 33 of the gripping members will be forced inwardly without being moved out of parallelism with the axis of the chuck.

If the gripping members are offset as shown in Fig. 2, their grip upon the inserted member will be increased if the collet is driven in the direction indicated by the arrow B in this figure.

Unscrewing the collar will release the pressure on the gripping members and upon the article between them and allow the spring to move the collet forwardly. The article between the gripping members may then be removed.

Figure 4:
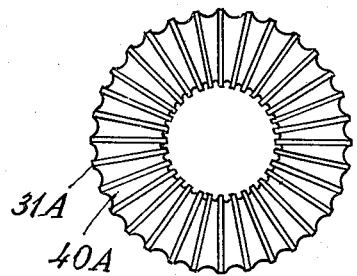
Fig. 4 is an end elevation of a collet of modified form.

The gripping members 31A of the collet shown in Fig. 4 are relatively thin flat metallic plates set radially about a common axis and held together by an adherent resilient binder 40A.

In Figs. 5 and 6 the gripping members 31B are transversely perforated as at 36. As shown in Fig. 5 there are a plurality of these perforations 36 in each gripping member longitudinally spaced from one another. In this case the resilient filler 40B not only fills the spaces between adjacent gripping members but it also passes through the perforations in these members and thus forms a plurality of longitudinally spaced continuous annular rings which hold the gripping members in desired relative positions. For this reason it is not necessary to use adherent material as a filler when the gripping members are provided with perforations through which the filler passes.

In Figs. 7 and 8 a collet with three gripping members 31C is shown. Each of these has a parallel sided radially extending flange 37 in which is an elongated opening 36A and an integral segmental flange 38. These flanges are tapered to form parts of a frustro-conical surface as in the construction previously described. The spaces between the gripping members and in the openings 36A are filled with resilient material 40C.

Three gripping members 31D are shown in Fig. 9 with comparatively thin radial spaces between them. The outer peripheries 34D of these gripping members form parts of a common frustro-conical surface. Longitudinally and transversely spaced openings 39 are formed in the edges of the gripping members. Adhesive resilient material 40D between the gripping members and in these openings hold the gripping members in desired relative positions. The inner edges 33A in this figure are shown concaved to form gripping edges.

The gripping members 31E shown in Fig. 10 are spirally curved to illustrate a modification within the scope of this invention.

A further modification is illustrated in Figs. 11 and 12 in which the gripping members 31F are in the form of sector-like flat plates longitudinally spaced and angularly staggered. The inner edges of these plates lie in a common cylindrical surface and their outer edges form parts of a common frustro-conical surface. These plates may be in parallel planes normal to the axis of the collet or in inclined planes as shown in Fig. 2 and are interconnected by a binder 40E of adherent resilient material.

In Fig. 13, 40F designates a body of adherent resilient material having an axial bore and a frusto-conical outer surface. 31G designates a plurality of angularly and longitudinally spaced gripping members embedded in the body 40F with their ends exposed.

The gripping members 60 in Figs. 14–18 are made of flat metallic plates having straight gripping edges 61 and oppositely inclined outer surfaces 62, 63. Lugs 64 are stamped out of these plates and bent outwardly at right angles therefrom as shown, leaving orifices 65 through the plates. In the specific form shown the lugs of each plate are in longitudinal alinement with each other. These are assembled, as shown in Figs. 17 and 18 with resilient material 66 filling the spaces between the plates and passing through the orifices therein.

In this case the part of the filler which passes through the orifices holds the plates together and the lugs which are embedded in the filler aid in holding the gripping members in desired relative positions and and resist cocking when subjected to the torsional effect of a tightening collar. When the outer surfaces of the gripping members are oppositely inclined they are arranged to lie in oppositely inclined frusto-conical surfaces in two relatively movable members.

A further development of this idea is shown in Figs. 19–21 in which the outer shape of the gripping members 60A is similar to those shown in Figs. 13–17, but in this case the lugs 64A are tapered and inclined downwardly toward the axis of the collet and bent out from the plates at less than a right angle. The lugs are of sufficient length to allow each of them to extend into an orifice 65A in an adjacent gripping member.

In Figs. 22 and 23 a collet is shown having its gripping members made of sector-like flat plates 60B with radially spaced lugs 64B and 67B punched and bent outwardly at right angles to the sides of the plates leaving orifices 65B through the plates. The resilient material 66 fills the spaces between the plates and passes through the orifices in them. When assembled, the lugs of each plate abut against the proximate surface of the adjacent plate and prevent relative longitudinal movement of the plates. In order to prevent the lugs coming opposite the orifices they may be relatively staggered as shown at *a* and *b* in the drawings.

Several embodiments of the invention are illustrated and described. In all of them the gripping edges are shown as lying in a cylindrical surface but this is not a necessary construction as they may be shaped to fit the contour of any desired object. The gripping members may be made to be forced inwardly by instrumentalities other than by relatively movable cones. In fact, many other modifications may be made within the spirit and scope of this invention and I intend no limitations other than those imposed by the following claims.

What I claim is:

1. A circumferentially continuous machine tool collet to be actuated by a conical cam surface of a chuck, comprising a plurality of angularly spaced rigid gripping members disposed about an axis and a body of resilient material interconnecting said members with inner and outer portions of the members exposed and with portions of the members extending to a conical surface concentric with said axis to engage said cam surface, with no portion of the resilient material extending beyond the cam engaging portions of the members.

2. A circumferentially continuous machine tool collet to be actuated by a conical cam surface of a chuck, comprising a plurality of angularly spaced rigid gripping members disposed about an axis and a body of resilient material interconnecting said members with inner and outer portions of the members exposed and with the outer portions of the members extending to a conical surface concentric with said axis to engage said cam surface, with no portion of the resilient material extending outwardly beyond the cam engaging portions of the members.

3. A circumferentially continuous machine tool collet to be actuated by a conical cam surface of a chuck, comprising a plurality of angularly spaced rigid gripping members disposed about an axis and a body of resilient material interconnecting said members with inner and outer portions of the members exposed, the inner portions of the members constructed to form gripping edges and with the outer portions of the members extending to a conical surface concentric with said axis to engage said cam surface, with no portion of the resilient material extending outwardly beyond the cam engaging portions of the members.

4. A circumferentially continuous machine tool collet to be actuated by a conical cam surface of a chuck, comprising a plurality of angularly spaced rigid gripping members disposed about an axis and a body of resilient material interconnecting said members, with inner and outer portions of the members exposed, the central axes of said members being tilted in one direction out of alinement with radial planes passing centrally through the members to provide a toggle action in one direction of rotation.

5. A circumferentially continuous machine tool collet to be actuated by a conical cam surface of a chuck, comprising a plurality of angularly spaced rigid gripping members disposed about an axis and a body of resilient material interconnecting said members, with inner and outer portions of the members exposed, the central axes of said members being tilted in one direction out of alinement with radial planes passing centrally through the members to provide a toggle action in one direction of rotation with portions of the members extending to a conical surface concentric with said axis to engage said cam surface.

6. A circumferentially continuous machine tool collet to be actuated by a conical cam surface of a chuck, comprising a plurality of angularly spaced longitudinally parallel rigid gripping members disposed about an axis and a body of resilient material interconnecting said members, with inner and outer portions of the members exposed and with portions of the members extending to a conical surface concentric with said axis to engage said cam surface, with no portion of the resilient material extending beyond the cam engaging portions of the members.

7. A circumferentially continuous machine tool collet to be actuated by a conical cam surface of a chuck, comprising a plurality of angularly spaced rigid gripping members spirally disposed in relation to an axis and a body of adherent resilient material interconnecting said members, with inner and outer portions of the members exposed and with portions of the members extending to a conical surface concentric with said axis to engage said cam surface.

8. A circumferentially continuous machine tool collet to be actuated by a conical cam surface of a chuck, comprising a plurality of angularly spaced substantially flat metallic plates disposed about an axis, and a body of adherent resilient material interconnecting said plates, with inner and outer edges of the plates exposed and with portions of the plates extending to a conical surface concentric with said axis to engage said cam surface, with no portion of the resilient material extending beyond the cam engaging edges of the plates.

9. A circumferentially continuous machine tool collet to be actuated by a conical cam surface of a chuck, comprising a plurality of angularly spaced substantially flat metallic plates disposed about an axis, and a body of adherent resilient material interconnecting said plates with inner and outer edges of the plates exposed, the inner portion of the plates constructed to form gripping edges and with the outer portions of the plates extending to a conical surface concentric with said axis to engage said cam surface, with no portion of the resilient material extending outwardly beyond the cam engaging edges of the plates.

10. A circumferentially continuous machine tool collet to be actuated by a conical cam surface of a chuck, comprising a plurality of angularly spaced perforated rigid members disposed about an axis, and a body of resilient material between said members and passing through the perforations therein with inner and outer edges of the members exposed and with portions of the members extending to a conical surface concentric with said axis to engage said cam surface, with no portion of the resilient material extending beyond the cam engaging portions of the members.

11. A circumferentially continuous machine tool collet to be actuated by a conical cam surface of a chuck, comprising a plurality of angularly spaced perforated flat metallic plates disposed about an axis, and a body of resilient material between said plates and passing through the perforations therein, with inner and outer edges of the plates exposed and with portions of the plates extending to a conical surface concentric with said axis to engage said cam surface, with no portion of the resilient material extending beyond the cam engaging portions of the plates.

12. A circumferentially continuous machine tool collet to be actuated by a conical cam surface of a chuck, comprising a plurality of angularly spaced flat metallic plates having orifices formed therein by punching out protruding lugs, said plates being disposed about an axis, and a body of resilient material between said plates and passing through said orifices, with inner and outer edges of the plates exposed and with portions of the plates extending to a conical surface concentric with said axis to engage said cam surface, with no portion of the resilient material extending beyond the cam engaging portions of the plates.

13. A circumferentially continuous machine tool collet to be actuated by a conical cam surface of a chuck, comprising a plurality of angularly spaced flat metallic plates having orifices formed therein by punching out protruding lugs, said plates being disposed about an axis, and a body of resilient material between said plates and passing through said orifices, with inner and outer edges of the plates exposed and with portions of the plates extending to a conical surface concentric with said axis to engage said cam surface, with no portion of the resilient material extending beyond the cam engaging portions of the plates, the lugs of each plate projecting into the orifices of adjacent plates.

ARTHUR MERRICK STONER.